(No Model.)
G. F. SIMONDS.
BALL BEARING.
No. 449,957. Patented Apr. 7, 1891.
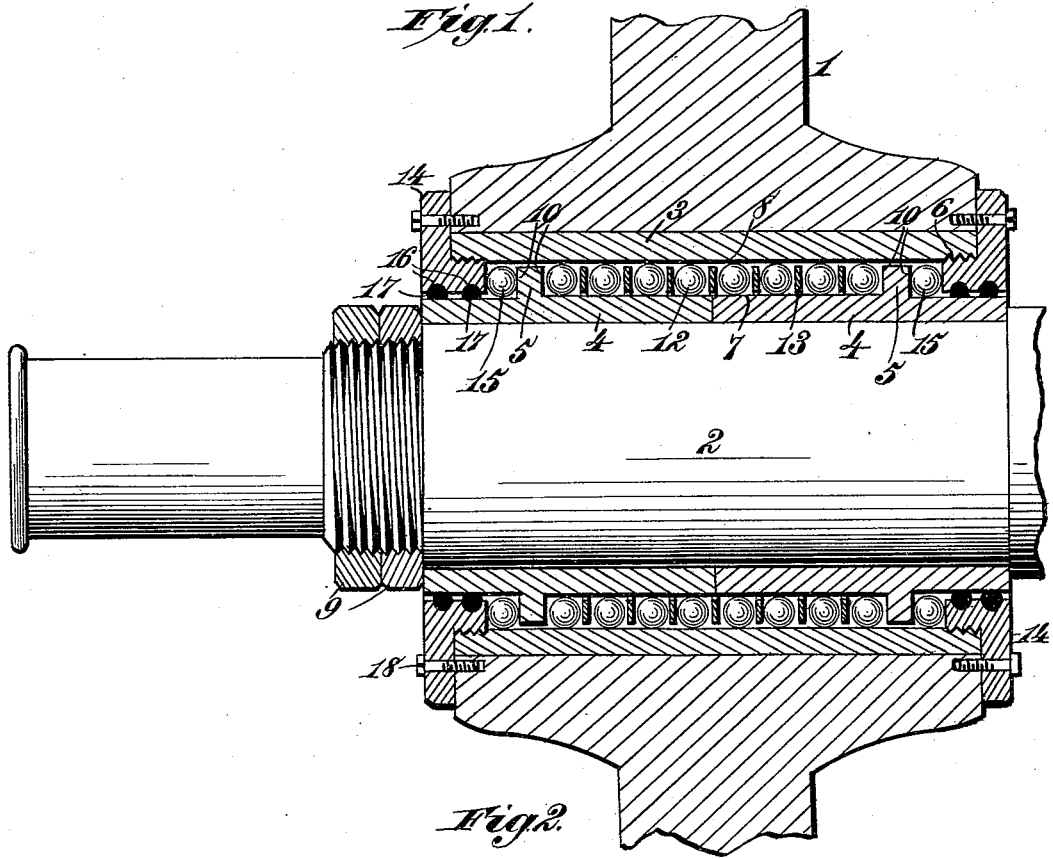
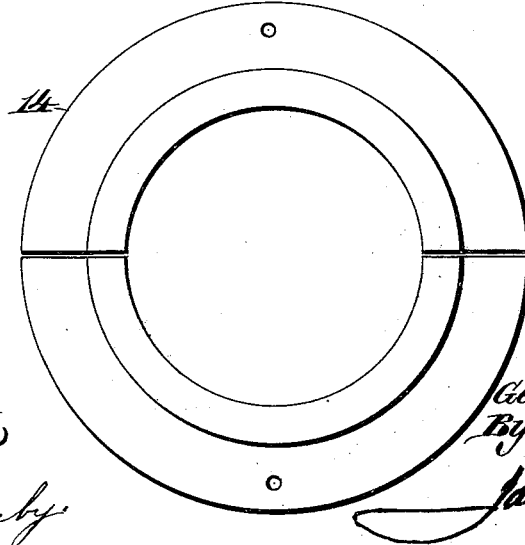
Witnesses.
Robert Garrett.
Dennis Sumby.
Inventor.
George F. Simonds,
By James L. Norris,
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 449,957, dated April 7, 1891.

Application filed August 14, 1890. Serial No. 362,015. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to bearings in which spherical rollers or balls are employed to diminish friction, to resist endwise thrusts or pressure, and to support or sustain radial pressure or weight, as described and shown in several Letters Patent issued to me August 19, 1890.

The object of the present invention is to provide a novel, efficient, durable, and economical ball-bearing for the wheels of cars and other heavy vehicles, and to such end the invention consists in a ball-bearing comprising two separate or independent sleeves, each provided with a circumferential projection, rib, or collar having parallel plane surfaces, a tubular piece or sleeve, which is flangeless or formed without a rib or collar, and annular sets of spherical rollers or balls located between the concentric and the plane surfaces of the rings or annular pieces, and the tubular piece or sleeve for resisting endwise thrusts or pressure and sustaining radial pressure or weight, the spherical rollers or balls for resisting radial pressure or weight being located in longitudinal planes between those which resist endwise thrusts or pressure.

The invention also involves the features of construction, the combination or arrangements of parts, and the principles of operation hereinafter described and claimed, reference being made to the accompanying drawings, which form a part of this specification, in which—

Figure 1 is a longitudinal central sectional view of a ball-bearing constructed in accordance with my invention and applied to a car-wheel which revolves upon a non-rotating axle. Fig. 2 is a detail plan view, looking at the inside of one of the screw-rings which serve to carry the packing.

In order to enable those skilled in the art to make and use my invention, I will now describe the same in detail, referring to the accompanying drawings, where—

The numeral 1 indicates the nave or hub of a car-wheel; 2, the spindle of a car-axle; 3, the flangeless tubular piece or sleeve, which is formed without any annular projection or rib, and 4 the two independent or separate rings or annular pieces, each of which is formed in proximity to its outermost end with an annular projection, rib, or collar 5.

The tubular piece or sleeve 3 is secured within the nave or hub of the car-wheel and is provided internally at each end with a screw-thread, as at 6, in such manner that the tubular piece or sleeve comprises a plane-surfaced cylindrical tube except as to the internal screw-threaded extremities 6.

The rings or annular pieces 4 are rigidly secured to the spindle 2 of the axle with their external surfaces 7 concentric with the internal surface 8 of the tubular piece or sleeve 3. The rings or annular pieces 4 abut against each other at a point centrally between the extremities of the spindle 2, and are preferably held in correct position upon such spindle by means of screw-nuts 9, engaged with the outer portion of the spindle, one of which nuts bears against the outer end portion of one of the rings or annular pieces, while the other nut serves as a locking-nut.

The annular projection, rib, or collar 5 of each ring or annular piece is formed with plane parallel surfaces 10, which are located at right angles to the concentric surfaces 7 and 8 of the rings or annular pieces and the tubular piece or sleeve.

In the space or channel between the projections, ribs, or collars 5 are arranged several annular sets of spherical rollers or balls 12, separated one set from the other by interposed rings or hoops 13 of any suitable construction and between each of the projections, ribs, or collars 5 and a sectional screw-ring 14, secured into engagement with the threaded extremity 6 of the tubular piece or sleeve, is arranged an annular set of spherical rollers or balls 15. The spherical rollers or balls 12 bear at diametrically-opposite points against and roll upon the concentric surfaces 7 and 8 of the rings or annular pieces 4 and the tubular piece or sleeve 8, and are retained in position through the medium of the rings or hoops 13 and the projections, ribs, or collars 5, the construction being such that the annular sets of spherical rollers or balls 12 serve only to sustain or support radial pressure or weight, and to this end such spherical rollers or balls have no pressure-supporting contact with the rings or hoops 13 or the projections, ribs, or collars 5.

The screw-threaded rings 14 have their inner surfaces parallel to the plane surfaces 10 of the projections, ribs, or collars 5 in such manner that the spherical rollers or balls 15 bear at diametrically-opposite points against the plane parallel surfaces of the screw-rings and the adjacent projection, rib, or collar 5, but have no pressure-supporting contact with the concentric surfaces of the rings or annular pieces and the tubular piece or sleeve, whereby the spherical rollers or balls 15 only resist or counteract endwise thrust or pressure.

In the arrangement exhibited the several annular sets of spherical rollers or balls for resisting radial pressure or weight are located in longitudinal planes between the annular sets of spherical rollers or balls 15, which resist or counteract endwise thrusts or pressure. The screw-rings 14 are each provided in its internal surface with two parallel annular grooves 16, containing packing-rings 17, that bear against the outer end portion of each ring or annular piece 4, for the purpose of making a tight joint between the parts to effectually exclude dust, dirt, water, and other foreign or objectionable substances which might damage the ball-bearing. The screw-rings are each composed of two halves or sections, Fig. 2, to enable the rings to be removed for renewing the packing-rings without disturbing the car-wheel or other parts. By this construction and arrangement of a screw-ring with a duplex packing at each end of the ball-bearing I provide simple and efficient means for excluding dust, dirt, and water, and adapt the ball-bearing for the wheels of cars and other heavy vehicles employing non-rotating axles.

The screw-threaded rings 14 are preferably locked in position by means of set bolts or screws 18, which pass through orifices in the screw rings and have a screw-threaded engagement with the nave or hub of the car or other wheel.

The invention is particularly designed for car-wheels, but may be used for heavy wagons or other vehicles and for shafts and the like.

Having thus described my invention, what I claim is—

1. A ball-bearing consisting of two separate or independent rings or annular pieces separably abutting at their inner ends and each provided in proximity to its outer end with a circumferential projection, rib, or collar, a cylindrical flangeless tubular piece or sleeve, annular sets of spherical rollers or balls arranged between the concentric surfaces of the rings or annular pieces and the tubular piece or sleeve for resisting endwise thrusts or pressure, and other sets of spherical rollers or balls for sustaining radial pressure or weight, the spherical rollers or balls for sustaining radial pressure or weight being located in longitudinal planes between the spherical rollers or balls which resist endwise thrust, substantially as described.

2. A ball-bearing consisting of two separate or independent rings or annular pieces adapted to be removably secured to the spindle of a car or other axle and abutting against each other at their inner end portions, and each having in proximity to its outer end portion a circumferential projection, rib, or collar, a tubular flangeless piece or sleeve adapted to be secured within the nave or hub of a car or other wheel and provided at each end with an internal screw-thread, a screw-threaded ring engaged with each of such screw-threads and provided with an annular groove containing a packing-ring, which rests upon one of the rings or annular pieces, annular sets of spherical rollers or balls arranged between the circumferential projections, ribs, or collars, and the screw-threaded rings for resisting endwise thrusts or pressure, and other sets of spherical rollers or balls between the circumferential projections for sustaining radial pressure or weight, substantially as described.

3. A ball-bearing for a car or other wheel, consisting of rings or annular pieces having circumferential projections, ribs, or rollers, a tubular piece or sleeve, annular sets of spherical balls or rollers for resisting endwise thrusts or pressure, other sets of spherical rollers or balls for sustaining radial pressure or weight, and a screw-ring engaging each end of the ball-bearing and composed of two internally-grooved sections, substantially as described.

In testimony whereof I have affixed my signature in presence of two witnesses.

GEO. F. SIMONDS.

Witnesses:
JOHN R. OLDFIELD,
WALTER A. SIMONDS.